(12) United States Patent
Cognigni et al.

(10) Patent No.: US 6,335,580 B1
(45) Date of Patent: Jan. 1, 2002

(54) COVER FOR THE CASE OF A REDUCTION UNIT OF A MOTOR REDUCER

(75) Inventors: Enzo Cognigni; Pietro Depietri, both of Bologna (IT)

(73) Assignee: Bonfiglioli Riduttori S.p.A. (IT)

( * ) Notice: Subject to any disclaimer, the term of this patent is extended or adjusted under 35 U.S.C. 154(b) by 0 days.

(21) Appl. No.: 09/472,405

(22) Filed: Dec. 27, 1999

(30) Foreign Application Priority Data

Mar. 16, 1999 (IT) .......................................... BO99U0031

(51) Int. Cl.[7] .................................................. H02K 5/00
(52) U.S. Cl. ........................................ 310/89; 74/606 R
(58) Field of Search .................. 310/88, 89; 74/606 R; 184/109

(56) References Cited

U.S. PATENT DOCUMENTS

| 2,933,102 A | * | 4/1960 | Hillman et al. ............. 137/854 |
| 3,145,582 A | * | 8/1964 | Wagner ..................... 74/606 R |
| 3,348,430 A | * | 10/1967 | Polzin ...................... 74/606 R |
| 4,020,715 A | * | 5/1977 | Sollars ...................... 74/606 R |
| 4,506,562 A | * | 3/1985 | Yamaura et al. ........... 74/606 R |
| 4,554,844 A | * | 11/1985 | Hamano ................... 74/606 R |
| 4,595,118 A | * | 6/1986 | Azuma et al. .......... 220/203.27 |
| 4,893,039 A | * | 1/1990 | Isii ............................... 310/89 |
| 5,522,769 A | * | 6/1996 | DeGuiseppi ................ 454/270 |
| 5,650,677 A | * | 7/1997 | Furukawa et al. ............. 310/88 |

FOREIGN PATENT DOCUMENTS

| CH | 312603 | 3/1956 |
| DE | 1 021 675 | 1/1956 |
| DE | 1 233 681 | 2/1967 |
| DE | 195 28 621 | 10/1996 |

* cited by examiner

*Primary Examiner*—Joseph Waks
(74) *Attorney, Agent, or Firm*—Lerner, David, Littenberg, Krumholz & Mentlik, LLP

(57) ABSTRACT

A cover equipped for the case of a reduction unit of a motor reducer, the case being designed to contain reducing gears; wherein the cover is provided with a first portion including a first opening having a corresponding first plug, the first plug having a through hole as a breather hole for the air and vapors from heating and shaking of the lubrication oil contained in the case, and wherein the cover is further provided with a second portion including a second opening having a corresponding second plug, the second opening operable for draining off used oil.

19 Claims, 2 Drawing Sheets

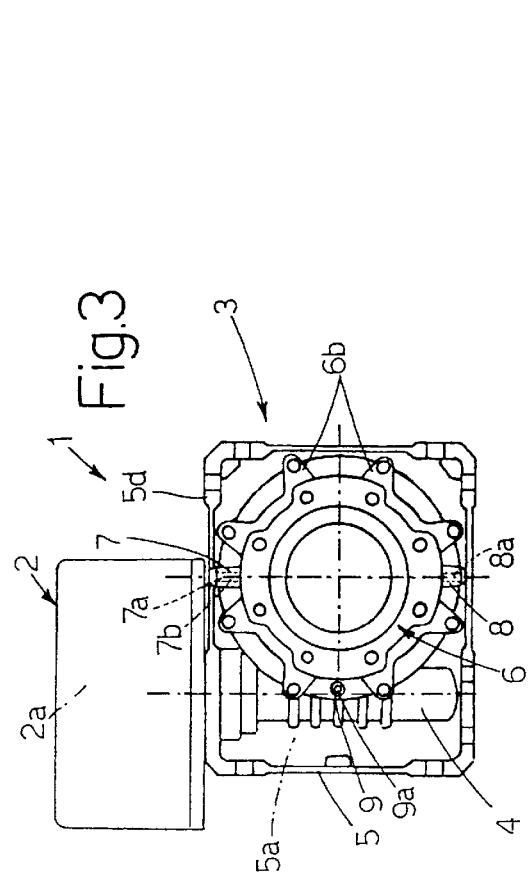
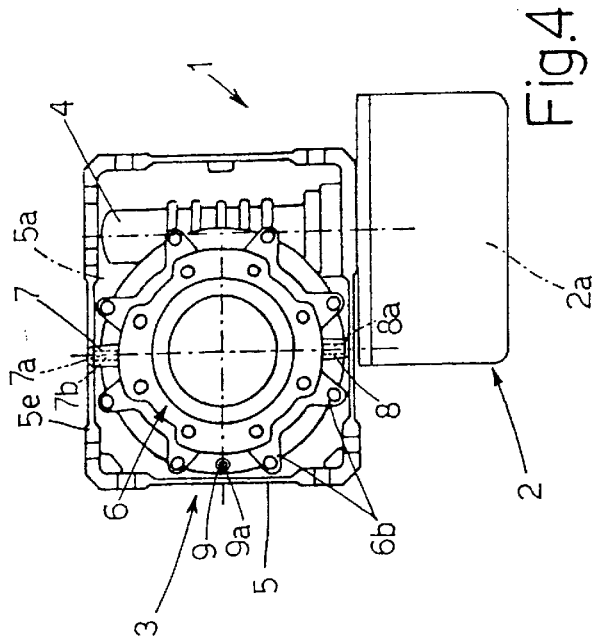
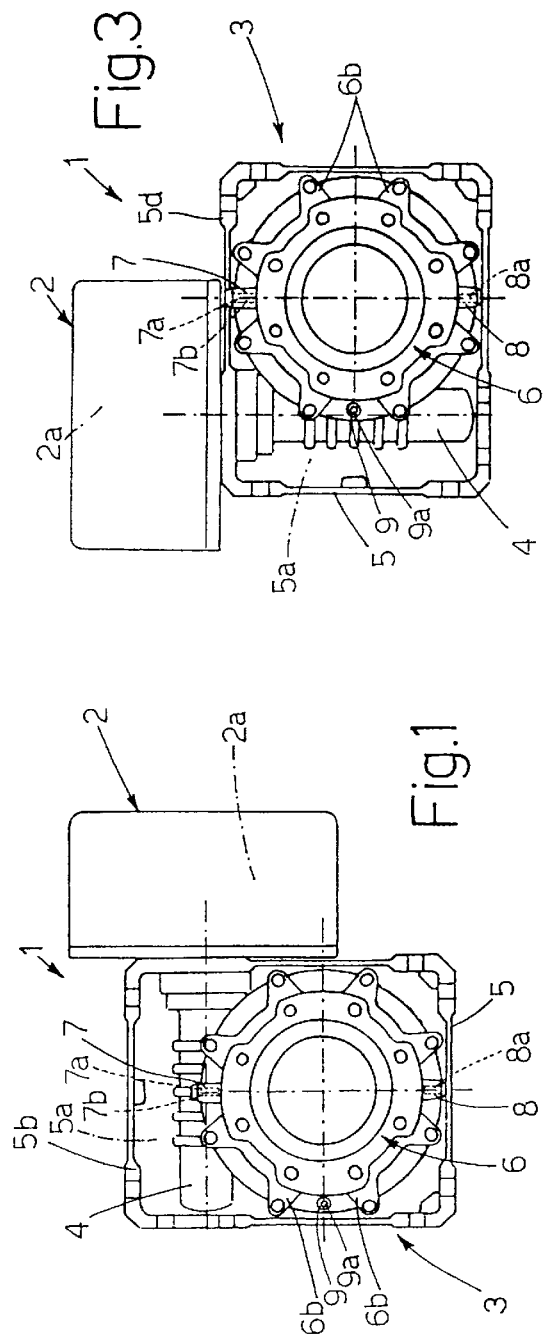
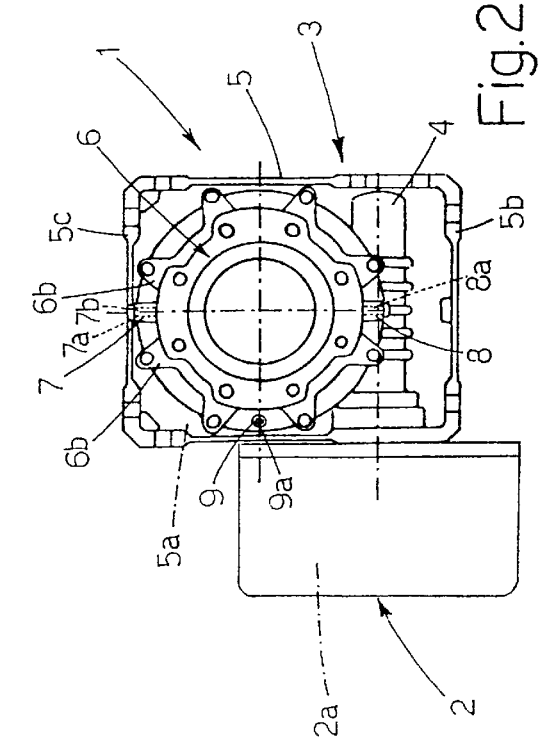

COVER FOR THE CASE OF A REDUCTION UNIT OF A MOTOR REDUCER

The present innovation regards a cover for the case of the reduction unit of a motor reducer. The innovation further regards a motor reducer, the case of the reduction unit of which comprises the said cover.

BACKGROUND OF THE INVENTION

As is known, a motor reducer in general comprises a casing, which contains inside it the electrical parts making up the electric motor, and a case for containing the gears that make up the speed-reduction unit. Normally, the electric motor assembly is fixed to the reduction unit by means of screws or similar mechanical elements.

In addition to containing, as has already been said, the reducing gears and the possible corresponding gear shafts, the case of a reduction unit also comprises a certain amount of lubricating oil which, in the traditional manner, facilitates sliding of the gear teeth over one another during meshing. For this reason, such a case of the reduction unit is in general provided with an opening through which lubricating oil is injected into the inside. With this opening, which is obviously set on the top of the case, a plug is associated, which is provided with a through hole as breather hole, by means of which it is possible to expel both the air that is present inside the case and the vapours that form, above all, on account of the heating and shaking to which the lubricating oil is subjected. By means of the aforesaid breather hole, it is thus possible to eliminate the overpressures that would form inside the case if there were not a passage leading out both for the air and for the vapours.

A solution adopted in some motor reducers known to the state of the art consists in making on the walls of the case a series of openings, each of which provided with a corresponding plug for closing, designed, according to the needs and the spatial positioning of the motor reducer, to provide a top opening for charging with lubricating oil and as a breather hole, a bottom opening for draining off the said oil, and an intermediate opening for reading the oil level. In other words, for each spatial position of the motor reducer, it will be necessary to choose a set of three openings, each provided with its own plug, consisting of a first, top, opening to be used for charging with lubricating oil and as a breather hole, a second, bottom, opening designed for discharging the used lubricating oil, and a third, intermediate, opening used for checking the oil level inside the case.

It is evident that, in order to guarantee breather operation, the closing plug combined with the top opening for oil filling must be provided with a through hole for breathing.

In another embodiment of the prior art there is no need for the openings to be provided for discharging the oil and the openings for checking maintenance of the oil level, because the case is filled, once and for all, with the lubricating oil that is to be used for the entire service life of the motor reducer. In this latter case, no opening may be provided. It is, however, advisable, even for this type of lubrication, to provide a through breather hole of the type previously described, so as to reduce overpressures inside the case.

From what has been said, it immediately emerges that in the traditional solutions the reduction-unit case must be provided with a large number of openings, each equipped with its own plug for closing, these openings being designed to work, as the need may be, as opening for oil filling, for discharging, or for checking oil level, according to the spatial position occupied by the motor reducer, a spatial position which ultimately depends upon the position of the mechanical device to which the motor reducer is to be coupled and upon the space available. It is likewise evident that, after the motor reducer has been fixed in its final position of use, only the plug set in the highest position will need to be provided with a through hole for expulsion of the air and vapours.

SUMMARY OF THE INVENTION

The purpose of the present innovation is thus to simplify the construction of cases for motor reducers considerably by eliminating the need to provide a large number of holes on the case and to associate to each hole a corresponding plug.

According to the present innovation, a cover is therefore made, equipped for the case of a reduction unit of a motor reducer, the said case being designed to contain the reducing gears; cover characterized in that it is provided with a first opening with which is combined a corresponding plug, the said plug being provided with a through hole as breather hole for the air and vapours that develop on account of the heating and shaking of the lubrication oil contained in the case.

A further subject of the present innovation is a motor reducer equipped with the said cover.

BRIEF DESCRIPTION OF THE DRAWINGS

The present innovation will now be described with reference to the attached drawings, which illustrate a non-limiting embodiment :hereof, in which:

FIG. 1 illustrates the cover that is the subject of the present innovation, combined with a motor reducer occupying a first spatial position;

FIG. 2 illustrates the cover that forms the subject of the present innovation, combined with a motor reducer occupying a second spatial position;

FIG. 3 illustrates the cover that is the subject of the present innovation, combined with a motor reducer occupying a third spatial position;

FIG. 4 illustrates the cover that is the subject of the present innovation, combined with a motor reducer occupying a fourth spatial position;

DETAILED DESCRIPTION OF THE INVENTION

Figure 6:
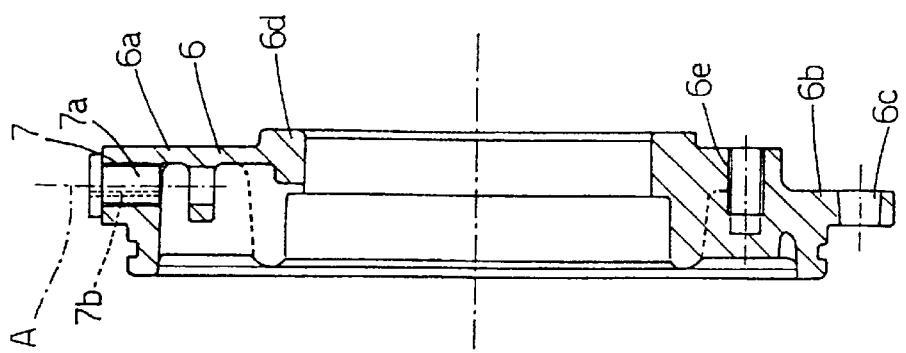
FIG. 6 illustrates a section VI—VI made on the plan of the previous figure.

As illustrated in FIGS. 1–4, a motor reducer 1 basically comprises an electric motor unit 2 associated mechanically to a speed-reduction unit 3.

The electric motor unit 2 is equipped with an electric motor 2a (not visible in the figures) which sets in rotation, in the embodiment considered, a worm screw 4, which meshes with a helical gear (not visible in the figures) that outputs motion from the reduction unit 2 with a speed of rotation lower than the one imparted by the electric motor to the worm screw 4.

The reduction unit 3 is equipped, in turn, with a case 5 having a basically parallelepipedal shape. One wall of the said case 5 is basically designed to provide the mechanical connection with the electric motor unit 2 by means of a number of screws (not visible). One of the walls of the case 5, designated by 5a and not represented in the attached drawings, is provided with a port that may be closed by a cover 6, which is the subject of the present innovation. The closable port is arranged to enable passage, in the assembly phase, of the helical gear (not represented) belonging to the reduction unit 2.

Figure 5:
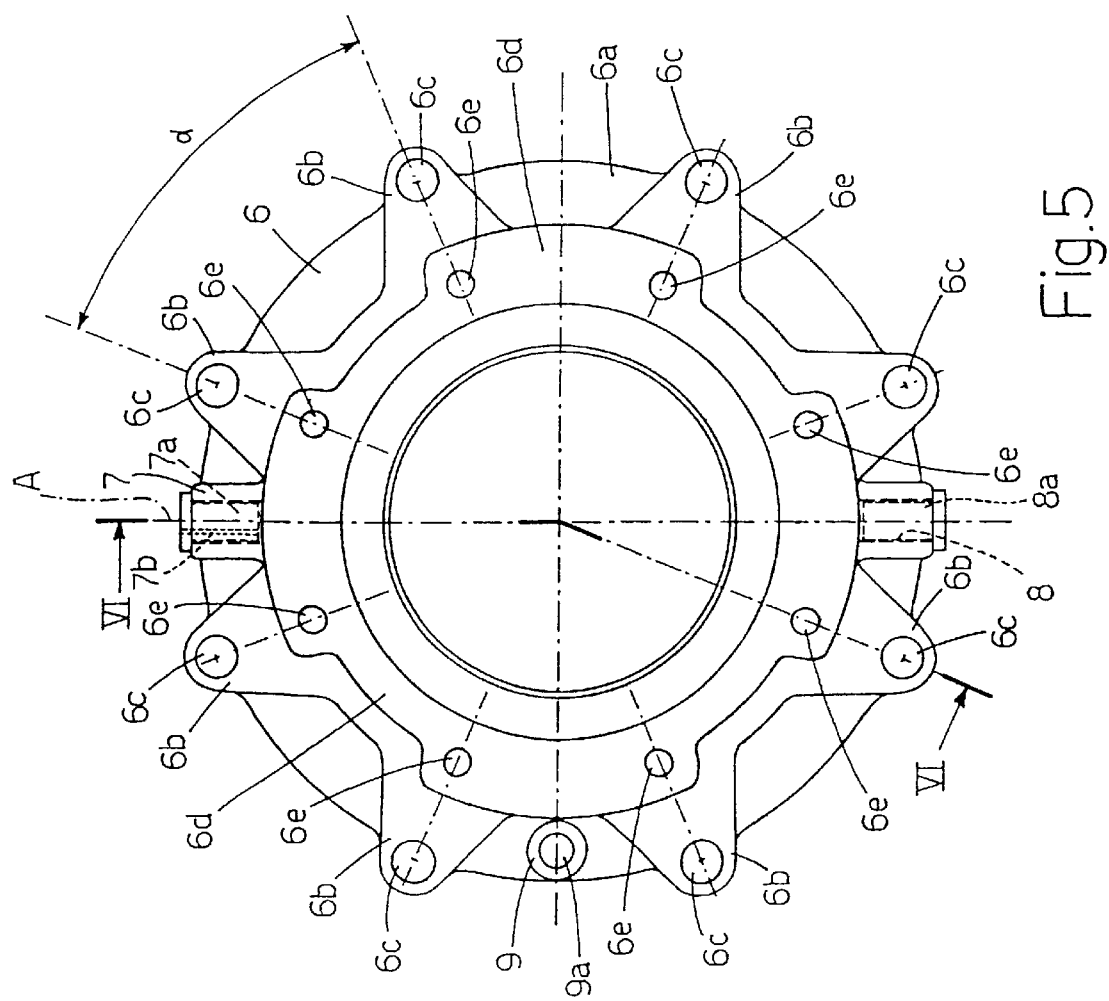
FIG. 5 shows a plan view of the cover that is the subject of the present innovation.

As may be noted from FIGS. 5 and 6, the cover 6 comprises, in turn, a main body 6*a* of a basically circular shape, provided with a number of lug-shaped elements 6*b*. Each of these lug-shaped elements 6*b* presents a corresponding through hole 6*c* able to receive a corresponding screw-type connecting element (not represented) with a corresponding threaded hole (not represented) made on the wall 5*a* of the case 5. A circular ring 6*d*, obtained as a single piece with the said main body 6*a*, is fixed to the main body 6*a*. This circular ring 6*d* is also provided with a number of threaded blind holes 6*e*, which can be used to fix the entire motor reducer 1 to any wall.

It may be said by the way that the number of equally spaced through holes 6*c* and the number of the corresponding holes for attachment on the wall 5*a* of the case 5 depend upon the angle of rotation by which the cover 6 will have to be rotated to adapt it to the new spatial position of the motor reducer 1. For example, to adapt the cover 6 to the four positions (each rotated through 90° with respect to the previous one) of the motor reducer 1 represented in FIGS. 1–4, it will be necessary to provide four holes (equally spaced by 90°), or multiples of four.

In the same way, in order to keep the opening 7 always at the top of the cover (6), for n spatial positions that the motor reducer 1 can occupy, it will be necessary to provide an equal number n (or multiples of n) of equally spaced holes on the wall 5*a* of the case 5.

In the embodiment represented in the attached figures, the through holes 6*c* and the threaded blind holes 6*e* are eight in number and equally spaced at an angle a of 45° apart. In particular, in this embodiment the positions of the through holes 6*c* correspond radially to the positions of the threaded blind holes 6*e*, even though it is easy for an expert in the field to devise a different arrangement of the said through holes 6*c* and of the threaded blind holes 6*e* without departing from the scope of the present innovation.

The cover 6 is further provided, in an innovative way, with a first portion including a first opening 7 which may be closed by means of a corresponding first plug 7*a* provided with a breather through hole 7*b*. The axis A of longitudinal symmetry of first opening 7 extends radially with respect to the main body 6*a*. By means of the first plug 7*a*, it is possible to open and close the first opening 7 periodically so as to fill the case 5 with lubricating oil. In addition, the presence of the through hole 7*b* enables continuous breathing off of the air and vapours present inside the case 5.

As represented in greater detail in FIGS. 5 and 6, the cover 6 may possibly be provided with a second portion having a second opening 8, in a lower position, for draining off the used oil. This second opening is provided with a corresponding second plug 8*a*. To complete the cover 6, a third portion having a third opening 9 may be provided, equipped with a corresponding third plug 9*a*, for checking the oil level. This third opening 9 is set at a height intermediate between the first opening 7 at top and the second opening 8 at the bottom.

In any case, the presence of the second and third openings 8, 9 and of the corresponding second and third plugs 8*a*, 9*a* depends upon the utilization of a lubricating oil that must be renewed and the level of which must be periodically checked. It is consequently evident that, in the case where an oil presenting a practically unlimited duration were to be used, there would no longer be the need to have available the openings second and third 8, 9 with the corresponding second and third plugs 8*a*, 9*a*. In this case, the cover 6 could be provided with the top opening 7 along, together with the corresponding first plug 7*a* provided with the through breather hole 7*b*.

As may be seen from FIGS. 1–4, as the spatial position of the motor reducer 1 varies, it will be necessary to unscrew the cover 6 from the case 5, to rotate the said cover 6 through a certain angle (in the case in point, 90°) so that the first opening 7 will always remain at the top, and it will be necessary to screw the said cover 6 back again in the new position.

With the equipped cover 6 which forms the subject of the present innovation, it will no longer be necessary to provide, as occurs in the devices of the prior art, an opening on the top wall of the case 5 according to the spatial position of the motor reducer 1. In particular, in the solutions existing in the state of the art, with a motor reducer 1 in the spatial position represented in FIG. 1, the opening equipped with breather plug must be located on the top wall 5*b* of the case 5, whilst in the position of FIG. 2, the opening equipped with breather plug must be located on the wall 5*c*. In the same way, in the spatial positions of the motor reducer 1 represented in FIGS. 3 and 4, the corresponding opening equipped with breather plug ought to be provided on the wall 5*d* (FIG. 3) or on the wall 5*e* (FIG. 4). Instead, adopting the solution proposed herein, if, for example, it is necessary to pass from the spatial position of FIG. 1 to that of FIG. 4 to optimize the position of the motor reducer according to the spaces available, it will be sufficient to unscrew the screws (not shown) corresponding to the through holes 6*c* of the cover 6 and screw them on the threaded holes (not shown) on the wall 5*a* of the case 5. It is evident that, since the position of the motor reducer 1 is rotated to pass, for example, from the situation of FIG. 1 to that of FIG. 4, the screws fixing the cover 6 to the case 5 must be screwed on threaded holes made on the wall 5*a*, which are in general different from the original holes.

In practice, by means of the simple device of a single hole 7 provided with a breather plug 7*a* on the cover 6, it is possible to carry out breathing of the case 5 without having to provide at least one opening equipped with a plug on each of the walls 5*a*–5*e* and without having to provide, moreover, one of these holes, i.e., the one set in a higher position with respect to the other, associated with a breather plug. In the devices of the prior art, the choice of the top wall 5*a*–5*e* on which the breather plug is to be positioned is evidently dictated by the spatial position of the motor reducer 1, which in turn depends upon the amount of clearance and the position of the mechanical device set downstream of the motor reducer 1 itself.

By means of the present innovation, instead, as has previously been said, as the position of the motor reducer 1 changes, it will be sufficient to unscrew the cover 6 from the case 5, and screw it back on the case 5 in such a way that the through opening 7 equipped with breather plug 7*a* always remains at the top of the cover 6, so that the oil present in the case 5 will not be able to spill out by gravity.

The advantages of the present cover 6 for the case 5 are evident from what has been said previously.

What is claimed is:

1. A cover for a case of a reduction unit of a motor reducer, said case having a plurality of walls and reducing gears, said cover comprising a first portion including a first opening having a corresponding first plug, said first plug having a through hole as a breather hole for air and vapors resulting from heating and shaking of lubrication oil contained in the case, and a second portion having a second opening having a corresponding second plug, said second opening operable for draining off used oil within said case.

2. The cover according to claim 1, wherein said cover further comprises a third portion having a third opening having a corresponding third plug, said third opening operable for checking the level of the lubricant oil present inside said case.

3. The cover according to claim 1, wherein said cover includes a number n, or multiple of n, of equally spaced holes, wherein said first portion is arranged at the top of said cover for an equal number of n spatial positions for said motor reducer.

4. The cover according to claim 1, in which said first opening is positioned in a peripheral region of said cover.

5. The cover according to claim 1, wherein said first opening is also operable for the introduction of the lubricant oil into said case.

6. The cover according to claim 1, wherein said cover includes a plurality of threaded blind holes which are operable for fixing said motor reducer to a portion of said case.

7. The cover according to claim 6, wherein each through hole is radially aligned with respect to each threaded blind hole.

8. The cover according to claim 1, 2, 3, or 4, wherein said cover includes a main body of circular shape, said first portion having an axis of longitudinal symmetry which extends radially with respect to said main body.

9. The cover according to claim 8, wherein said cover further comprises a plurality of through holes operable for fixing said cover to a wall of said case.

10. The cover according to claim 8, wherein each through hole is radially aligned with respect to each threaded blind hole.

11. The cover according to claim 1, 2, 3 or 4 wherein said cover further comprises a plurality of through holes operable for fixing said cover to a wall of said case.

12. A motor reducer comprising an electric motor unit and a speed-reduction unit, said speed-reduction unit including a case containing reducing gears; and a cover for said case comprising a first portion including a first opening having a corresponding first plug, said first plug having a through hole, and a second portion including a second opening having a corresponding second plug, said second plug operable for draining off oil within said case.

13. A motor reducer according to claim 12 wherein said cover further comprises a third portion having a third opening having a corresponding third plug, said third opening operable for checking the level of the lubricant oil present inside said case.

14. A motor reducer according to claim 12 wherein said cover includes a number n, or multiple of n, of equally spaced holes, wherein said first portion is arranged at the top of said cover for an equal number of n spacial positions for said motor reducer.

15. A motor reducer according to claim 12, wherein said first opening is positioned in a peripheral region of said cover.

16. A motor reducer according to claim 12, wherein said cover includes a main body of circular shape, said first opening having an axis of longitudinal symmetry which extends radially with respect to said main body.

17. A motor reducer according to claim 12, wherein said cover further comprises a plurality of through holes operable for fixing said cover to wall of said case.

18. A motor reducer according to claim 12, wherein said cover further comprises a plurality of through holes operable for fixing said cover to a wall of said case.

19. A cover for a case of a reduction unit of a motor reducer, said cover comprising a first portion including a first opening having a corresponding first plug, said first plug having a through hole, and said second portion including a second opening having a corresponding second plug, said second opening operable for draining oil within said case.

* * * * *